May 31, 1960  F. W. KRAPF, JR  2,938,687
SAFETY DEVICE
Filed Aug. 27, 1954  2 Sheets-Sheet 1
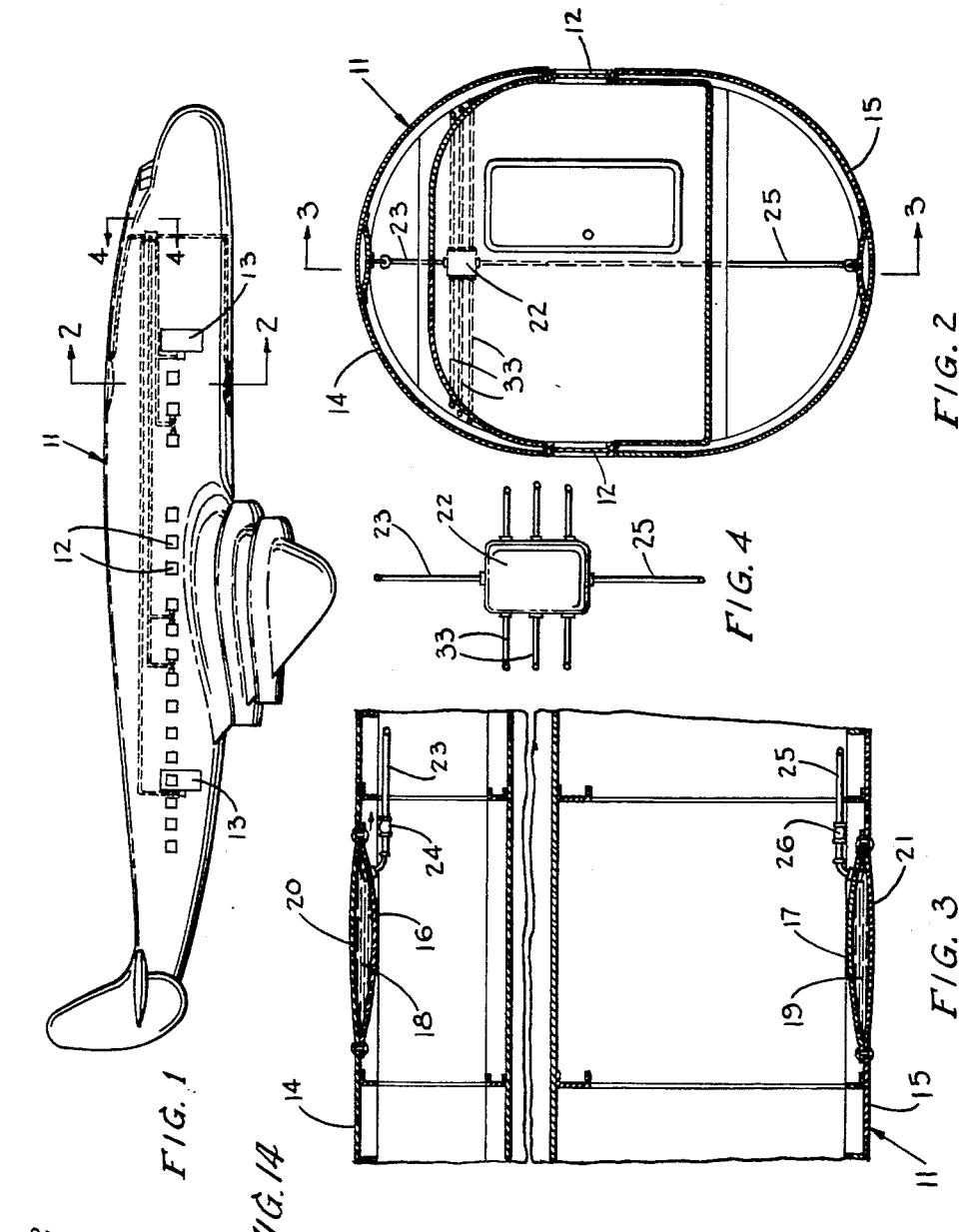
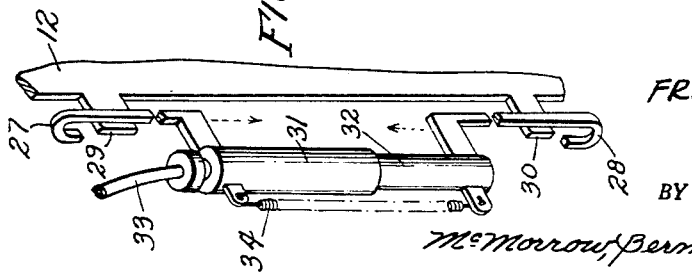
FRED W. KRAPF, JR.
INVENTOR.
BY
McMorrow, Berman + Davidson
ATTORNEYS May 31, 1960 F. W. KRAPF, JR 2,938,687
SAFETY DEVICE
Filed Aug. 27, 1954
2 Sheets-Sheet 2

FRED W. KRAPF, JR.
INVENTOR.

BY
McMorrow, Berman & Davidson
ATTORNEYS

United States Patent Office 2,938,687
Patented May 31, 1960

2,938,687

SAFETY DEVICE

Fred W. Krapf, Jr., 865 Sayre Ave., Dayton 7, Ohio

Filed Aug. 27, 1954, Ser. No. 452,631

1 Claim. (Cl. 244—129)

This invention relates to aircrafts, and more particularly to an improved safety device arranged to automatically release the doors and windows of an aircraft, as well as to energize the electrical fire extingishing circuits of the aircraft when the aircraft makes a crash landing or when a similar emergency arises.

A main object of the invention is to provide a novel and improved safety device for an aircraft, said device involving simple components, being easy to install, and greatly reducing the hazards to the occupants of the aircraft in the event of crash landings or other accidents to the aircraft involving the contact of the fuselage of the aircraft with the ground or obstacles.

A further object of the invention is to provide an improved safety device for aircraft which operates automatically to release the closures of the aircraft, such as the doors and windows thereof, in the event of a crash landing or similar emergency, enabling the occupants of the aircraft to escape therefrom, the device also operating automatically to close the electrical fire-extinguishing circuits of the aircraft, whereby the dangers of fire are considerably reduced, the improved device involving relatively inexpensive components, the components of the device being relatively light in weight, and the device being reliable in operation.

Further objects and advantages of the invention will become apparent from the following description and claim, and from the accompanying drawings, wherein:

Figure 1 is a side elevational view of an aircraft provided with safety devices according to the present invention;

Figure 2 is an enlarged transverse vertical cross sectional view taken on line 2—2 of Figure 1;

Figure 3 is a vertical cross sectional view taken on line 3—3 of Figure 2;

Figure 4 is an elevational view showing the common connection chamber for the fluid conduits employed in the aircraft safety system of Figures 1 to 3;

Figure 12:
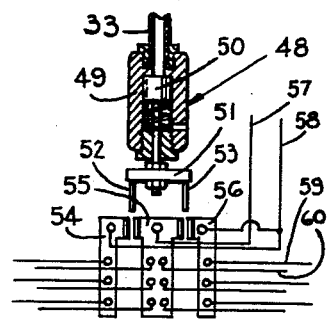
Figure 12 is a fragmentary wiring diagram showing the normally open, fluid pressure-operated switch means associated with electrical latch-releasing and fire extinguisher circuits of an aircfratf which may be operated by the present invention.
Figure 6:
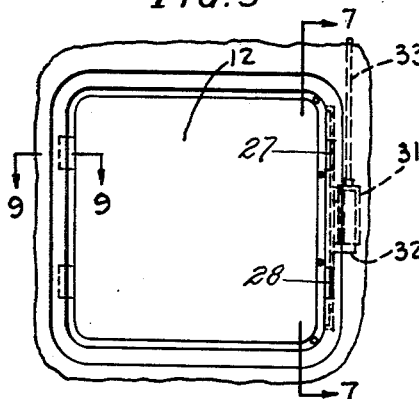
Figure 6 is an enlarged elevational view of one of the windows of the aircraft, illustrating the fluid pressure-operated means for releasing the window in the event of a crash landing, by means of the device of the present invention.
Figure 10:
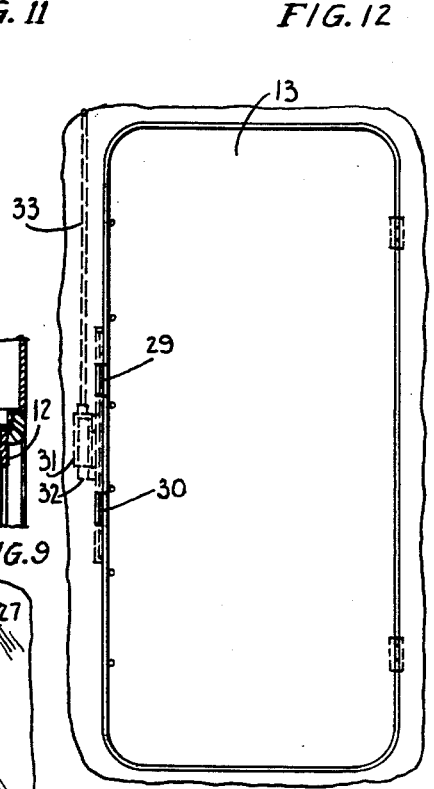
Figure 10 is an enlarged elevational view of a door of the aircraft, said door being provided with fluid pressure-controlled latch-releasing means according to the present invention.
Figure 9:
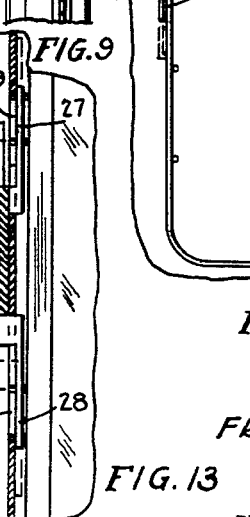
Figure 9 is an enlarged cross sectional detail view taken on line 9—9 of Figure 6.
Figures 7, 8, 13:
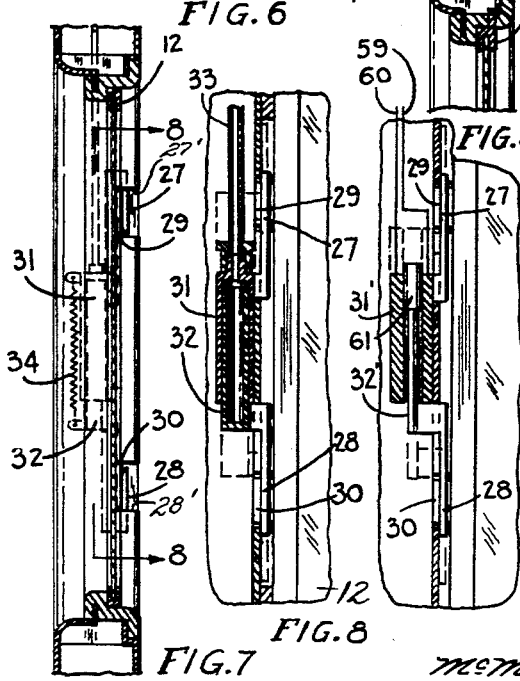
Figure 7 is an enlarged vertical cross sectional view taken on line 7—7 of Figure 6.
Figure 8 is a cross sectional detail view taken on line 8—8 of Figure 7.

Figure 13 is an enlarged cross sectional detail view taken through a solenoid operated latch means which may be employed in place of the fluid pressure-operated latch means of Figures 7 and 8 and which may be controlled by the circuits shown in Figure 12, concurrently with the electrical fire-extinguishing circuits of the aircraft; and Figure 14 is an enlarged perspective view showing one of the fluid pressure-operated closure latch mechanisms employed in the form of the invention illustrated in Figures 6, 7 and 8, the movable latch members being shown disengaged from the abutment elements on associated closure members.

Referring to the drawings, 11 designates the fuselage of a conventional aircraft, said aircraft having the detachable window closures 12 and the doors 13. The top wall of the fuselage 11 is designated at 14, and the bottom wall thereof is designated at 15, as shown in Figures 2 and 3. The walls 14 and 15 of the fuselage 11 are made of relatively flexible material, such as sheet metal or the like, and secured to the top and bottom walls 14 and 15 on the inside of the fuselage are respective bowed plates 16 and 17, said plates being secured at their peripheral portions to the inside surfaces of the top and bottom walls 14 and 15 to define respective chambers 18 and 19. Since the sheet material of the fuselage top and bottom walls 14 and 15 is relatively flexible, the outer walls of said chambers, as shown respectively at 20 and 21 are relatively flexible.

The chambers 18 and 19 may be located in suitable portions of the fuselage, particularly portions which would be subject to impact in the event of a crash landing or similar emergency, whereby the flexible outer walls 20 and 21 of the chambers 18 and 19 would be likely to be struck in the event of such emergency.

Mounted in a suitable portion of the fuselage, for example, in a forward portion thereof, is a junction chamber. The top chamber 18 is connected to the junction chamber 22 by a conduit 23, said conduit including a check valve 24 allowing flow of fluid only toward the junction chamber 22. Similarly, the chamber 19 is connected to the junction chamber 22 by a conduit 25 which includes a check valve 26 allowing flow of fluid only toward the junction chamber 22.

The detachable windows and the doors 13 of the aircraft are provided with slidable top and bottom latch members 27 and 28 which are lockingly engageable with respective stationary abutment lugs 29 and 30, to normally prevent said lugs from passing outwardly through correspondingly shaped notches 27' and 28' formed in the adjacent margin of the enclosure frame, as shown in Figure 7, whereby to retain the closures against opening, the latch member 27 being movable upwardly and the latch member 28 being movable downwardly and being formed to disengage from the respective abutment lugs 29 and 30 responsive to such movement. However, suitable biasing springs 34 are provided for biasing the latch members 27 and 28 toward positions wherein said latch members are lockingly engaged with the abutment lugs 29 and 30, as shown in Figure 7.

Latch member 27 is rigidly secured to an outer cylinder element 31 which is suitably mounted for sliding movement with respect to the associated closure member and which is slidable upwardly, as viewed in Figure 8. Rigidly secured to the lower latch member 28 is an inner cylinder element 32 which is telescopically received in the cylinder element 31, said inner cylinder element 32 being slidable downwardly, for example, to the dotted view position thereof as shown in Figure 8, whereby the latch member 28 may be disengaged from the abutment element 30. A flexible conduit 33 is connected to the top end of the outer cylinder element 31, said flexible conduit 33 leading to the junction chamber 22. Respective conduits 33 are provided for each of the closures, including both doors and windows of the aircraft, whereby the latch means associated with said closure members will be operated to release the closure members in response to the building up of fluid pressure in the junction chamber 22.

As shown in Figure 7, the cylinder elements 31 and 32 are biased toward contracted telescoped relationship by means of the spring 34 connecting the top portion of the cylinder element 31 to the bottom portion of the cylinder element 32.

When an accident occurs, such as a crash landing, the flexible outer wall of one or the other of the chambers 18 and 19 will be struck and will be deflected inwardly, causing a build up fluid pressure to be developed in the junction chamber 22 because of the decrease in volume of the chamber 18 or 19 affected. This build up of pressure is transmitted through the conduits 33 to the respective fluid pressure-controlled latch devices, causing the respective cylinder elements 31 and 33 of the latch devices to be spread apart vertically, as shown in dotted view in Figure 8, and as shown in full lines in Figure 14, and causing the latch elements 27 and 28 thereof to be disengaged from the abutment members 29 and 30, releasing the closure members and allowing the passengers of the aircraft to escape therefrom through the openings formerly covered by the closure members.

Any suitable fluid may be employed in the system, such as oil, or a suitable gas, such as air.

It will be understood that any desired number of flexible fuselage chambers, such as the chambers 18 and 19 may be employed on the fuselage of the aircraft, located at suitable points on the fuselage, and that each chamber will be connected to the junction chamber 22 of the system.

Figure 5:
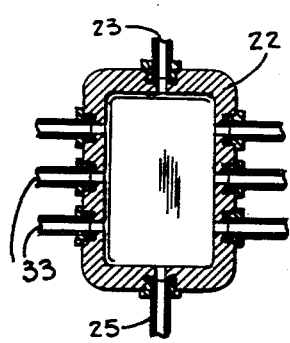
Figure 5 is an enlarged cross sectional view taken through the connection chamber of Figure 4.
Figure 11:
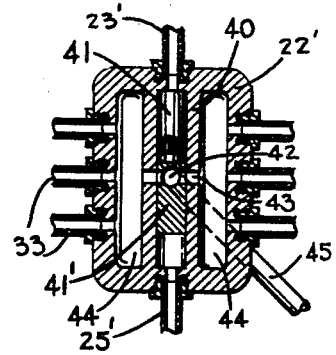
Figure 11 is a vertical cross sectional view taken through the fluid conduit connection chamber of a modified form of safety device according to the present invention.

Referring now to Figures 11 and 12, the junction chamber of the safety system is designated at 22' and has connected thereto the respective flexible conduits 33 which connect the fluid pressure-controlled latch means of the closure members of the aircraft to the junction chamber 22'. Also connected to the junction chamber 22' are the conduits 23' and 25' leading to the respective flexible fuselage chambers mounted in the top and bottom wall portions of the fuselage.

The conduits 23' and 25' communicate with the top and bottom ends of a central vertical cylinder 40 containing the respective pistons 41 and 41'. The pistons have respective apertures 42 which may be moved into registry with ports 43 provided centrally in the cylinder 40 when the pressures in the top and bottom portions of cylinder 40 become unbalanced.

A conduit 45 connects the intermediate portion of cylinder 40 to a suitable source of fluid pressure. Normally, the ports 43 are blocked by the abutting inner end portions of the pistons 41 and 41'. When an accident occurs, such as a crash landing, the flexible outer wall of one of the chambers 18 or 19 will be deflected inwardly, causing an unbalance in cylinder 40, whereby the aperture 42 of one of the pistons will be moved into registry with the ports 43, allowing fluid under pressure from conduit 45 to flow to the conduits 33 and to release the closure latch devices.

According to a modified form of the present invention, shown in Figure 12, each conduit 33 may be connected to a fluid pressure-operated switch 48, said switch 48 including a cylinder 49 containing a piston 50, said piston being normally elevated in the cylinder 49, as shown in Figure 12. Secured to the piston is a transverse arm 51 carrying the respective switch contacts 52 and 53 which are normally spaced from the respective contact bars 54, 55 and 56, shown in Figure 12, and which are bridgingly engageable with said contact members when fluid pressure develops in the conduit 33. Thus, when the piston 50 is moved downwardly by the fluid pressure developed in the conduit 33, the circuit wires 57 and 58 will be connected together. Said circuit wires 57 and 58 represent normally disconnected portions of the fire-extinguishing circuits of the aircraft, which when connected together, energize the fire-extinguishing apparatus of the aircraft. Thus, when an abnormal fluid pressure develops in the conduit 23' or 25', as when one of the chambers 18, 19, or the like of the fuselage is struck, causing the corresponding flexible outer wall portion to be deflected inwardly, the piston 41 or 41' is moved, whereby fluid pressure conduit 45 comes into communication with the conduits 33, and whereby operating fluid pressure is developed for releasing the latch means associated with the respective closures of the aircraft and at the same time causing the fire-extinguishing circuit of the aircraft to be energized, whereby the fire-extinguishing apparatus of the aircraft begins to function.

As shown in Figure 12, additional circuits, comprising conductors 59 and 60 are controlled by the fluid pressure switch 48, and these circuits are employed to control solenoid-operated latches for the closures of the aircraft. For example, in Figure 13, a latch element 27 is shown rigidly connected to a slidable solenoid 31' which is provided with the slidable plunger 32'. Rigidly connected to the plunger 32' is the slidable latch element 28. As in Figures 7 and 8, the latch element 27 cooperates with the abutment lug 29 and the latch element 28 cooperates with the abutment lug 30. Latch element 27 is formed to disengage from lug 29 responsive to upward movement of the latch element 27, and latch element 28 is formed to disengage from lug 30 responsive to downward movement of latch element 28. When the solenoid 31' is energized, as by the connection of its winding through the wires 59 and 60 to a suitable battery or other source of current, the magnetic portion of the plunger 32' is moved downwardly into the solenoid winding 31', the solenoid winding 31' being at the same time moved toward said magnetic portion, whereby latch element 27 is moved upwardly and latch element 28 is simultaneously moved downwardly, causing the latch elements 27 and 28 to disengage from their associated abutment members 29 and 30.

As shown in Figure 13, the magnetic portion of the plunger 32', shown at 61 is normally disposed at the top end of the movable solenoid winding member 31', and is urged downwardly toward the intermediate portion of the winding member 31' when said winding member becomes energized.

While certain specific embodiments of an improved safety system for an aircraft have been disclosed in the foregoing description, it will be understood that various modifications within the spirit of the invention may occur to those skilled in the art. Therefore it is intended that no limitations be placed on the invention except as defined by the scope of the appended claim.

What is claimed is:

In an aircraft, a fuselage, a bowed plate secured at its peripheral portion to the inside surface of a wall portion of said fuselage defining a chamber therebetween, fluid in said chamber and substantially filling same, said wall portion being relatively flexible and being movable inwardly by impact with an object, a closure member detachably mounted in another wall portion of said fuselage, a pair of spaced abutment elements projecting from an edge of said closure member, a pair of telescoping cylinders mounted in the fuselage, respective latch elements on the cylinders normally lockingly engaging said abutment elements and being formed to disengage therefrom responsive to outward extension of the cylinders, said another wall portion being formed with notches adjacent said abutment elements through which said abutment elements may pass when released by said latch elements, and conduit means connecting said chamber to said cylinders, whereby inward deformation of said first-named flexible wall portion causes fluid pressure to be developed in said conduit means and to extend said cylinders, whereby to move said latch elements to disengage from said abutment elements.

References Cited in the file of this patent

UNITED STATES PATENTS

| | | |
|---|---|---|
| 1,701,491 | Casey | Feb. 12, 1929 |
| 1,818,597 | Adams et al. | Aug. 11, 1931 |
| 1,869,791 | Wright | Aug. 2, 1932 |
| 2,348,426 | Sparrow | May 9, 1944 |
| 2,517,860 | Forgy | Aug. 8, 1950 |
| 2,522,849 | Taylor | Sept. 19, 1950 |
| 2,551,752 | Mathisen | May 8, 1951 |
| 2,647,789 | Chayne | Aug. 4, 1953 |
| 2,683,194 | Mathisen | July 6, 1954 |

FOREIGN PATENTS

| | | |
|---|---|---|
| 1,050,268 | France | Sept. 2, 1953 |